United States Patent
Kim et al.

(10) Patent No.: US 12,255,336 B2
(45) Date of Patent: Mar. 18, 2025

(54) NEGATIVE ELECTRODE AND LITHIUM SECONDARY BATTERY INCLUDING SAME

(71) Applicant: LG Energy Solution, Ltd., Seoul (KR)

(72) Inventors: Dong Hyuk Kim, Daejeon (KR); Yong Ju Lee, Daejeon (KR); Il Geun Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 687 days.

(21) Appl. No.: 17/429,085

(22) PCT Filed: Feb. 7, 2020

(86) PCT No.: PCT/KR2020/001757
§ 371 (c)(1),
(2) Date: Aug. 6, 2021

(87) PCT Pub. No.: WO2020/162708
PCT Pub. Date: Aug. 13, 2020

(65) Prior Publication Data
US 2022/0131157 A1    Apr. 28, 2022

(30) Foreign Application Priority Data
Feb. 8, 2019  (KR) .................. 10-2019-0015166

(51) Int. Cl.
*H01M 4/62*     (2006.01)
*H01M 4/13*     (2010.01)
*H01M 4/133*    (2010.01)
*H01M 4/134*    (2010.01)
*H01M 10/0525*  (2010.01)
*H01M 4/02*     (2006.01)

(52) U.S. Cl.
CPC ........... *H01M 4/626* (2013.01); *H01M 4/133* (2013.01); *H01M 4/134* (2013.01); *H01M 10/0525* (2013.01); *H01M 2004/021* (2013.01); *H01M 2004/027* (2013.01); *H01M 2220/10* (2013.01); *H01M 2220/20* (2013.01)

(58) Field of Classification Search
CPC ...... H01M 4/626; H01M 4/133; H01M 4/134; H01M 10/0525; H01M 2004/021; H01M 2004/027; H01M 2220/10; H01M 2220/20
See application file for complete search history.

(56) References Cited

U.S. PATENT DOCUMENTS

| | | |
|---|---|---|
| 2007/0087268 A1 | 4/2007 | Kim et al. |
| 2011/0189510 A1 | 8/2011 | Caracciolo et al. |
| 2013/0004846 A1* | 1/2013 | Kim ............... H01M 4/366 977/773 |
| 2013/0089784 A1 | 4/2013 | Cho et al. |
| 2013/0130115 A1 | 5/2013 | Park et al. |
| 2013/0209883 A1 | 8/2013 | Park et al. |
| 2014/0234710 A1 | 8/2014 | Lee et al. |
| 2015/0008374 A1* | 1/2015 | Kim ............... H01M 4/62 252/503 |
| 2016/0133939 A1 | 5/2016 | Son et al. |
| 2017/0005329 A1 | 1/2017 | Kim et al. |
| 2017/0077497 A1 | 3/2017 | Ogata et al. |
| 2017/0179467 A1 | 6/2017 | Dale et al. |
| 2018/0342757 A1 | 11/2018 | Choi et al. |
| 2019/0036122 A1 | 1/2019 | Iordache et al. |
| 2019/0288281 A1 | 9/2019 | Choi et al. |
| 2021/0351432 A1 | 11/2021 | Choi et al. |

FOREIGN PATENT DOCUMENTS

| | | | |
|---|---|---|---|
| CN | 102122708 A | * | 7/2011 |
| CN | 103107335 A | | 5/2013 |
| CN | 104319373 A | | 1/2015 |
| EP | 2579365 A1 | | 4/2013 |
| KR | 20070041900 A | | 4/2007 |
| KR | 20120131881 A | | 12/2012 |
| KR | 20130004536 A | | 1/2013 |
| KR | 20130055920 | * | 5/2013 |
| KR | 20130055920 A | | 5/2013 |
| KR | 20130056668 A | | 5/2013 |
| KR | 20130004536 U | | 7/2013 |
| KR | 20130092943 A | | 8/2013 |
| KR | 20140104066 A | | 8/2014 |
| KR | 20150005278 A | | 1/2015 |
| KR | 20150020959 A | | 2/2015 |
| KR | 20160054315 A | | 5/2016 |
| KR | 20170004673 A | | 1/2017 |
| KR | 20170033123 A | | 3/2017 |
| KR | 20170137000 A | | 12/2017 |

(Continued)

OTHER PUBLICATIONS

KR 20130055920MT (Year: 2015).*

(Continued)

*Primary Examiner* — Alexander Usyatinsky
(74) *Attorney, Agent, or Firm* — Lerner David LLP

(57) ABSTRACT

A negative electrode and a lithium secondary battery include the negative electrode, wherein the negative electrode includes a metal current collector and a negative electrode active material layer including a negative electrode active material and metal nanowires and formed on the metal current collector. The negative electrode active material includes a silicon-based active material and a carbon-based active material, and the metal nanowires include one or more metals selected from the group consisting of copper, gold, nickel, cobalt, and silver.

12 Claims, No Drawings

(56) References Cited

FOREIGN PATENT DOCUMENTS

WO     2017137591 A1     8/2017
WO     2018164405 A1     9/2018

OTHER PUBLICATIONS

CN-102122708 MT (Year: 2011).*
SIPO Decision to grant a Patent (Year: 2024).*
Search report from International Application No. PCT/KR2020/001757, mailed May 12, 2020.
Extended European Search Report including Written Opinion for Application No. 20752577.5 dated Jan. 28, 2022, pp. 1-8.

* cited by examiner

NEGATIVE ELECTRODE AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2020/001757, filed on Feb. 7, 2020, which claims priority from Korean Patent Application No. 10-2019-0015166, filed on Feb. 8, 2019, the disclosures of which are incorporated herein in their entirety by reference.

TECHNICAL FIELD

The present invention relates to a negative electrode and a lithium secondary battery including the same, the negative electrode including a silicon-based active material, a carbon-based active material, and metal nanowires.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having a high energy density, that is lithium secondary batteries having a high capacity, have been subjected to considerable research and also have been commercialized and widely used.

In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a silicon-based particle having a high discharge capacity may be used. However, a silicon-based active material has a low initial efficiency, and the volume thereof expands excessively during a charge/discharge process, so that a problem of the deterioration in battery lifespan occurs.

In order to solve the problem, research is being conducted in various ways on measures of further adding a carbon-based conductive material such as carbon nanotubes or graphene. However, when using a carbon-based conductive material, the conductivity is improved, but the initial efficiency is still low, so that there is a problem in that commercialization is difficult.

Therefore, there has been a demand for developing a negative electrode active material, the volume change of which is effectively controlled during a charge/discharge process of a secondary battery, thereby exhibiting excellent lifespan properties as well as an excellent conductivity and an excellent initial efficiency.

PRIOR ART DOCUMENT

Patent Document (Patent Document 1) Korean Patent Laid-Open Publication No. 10-2013-0092943

DISCLOSURE OF THE INVENTION

Technical Problem

An aspect of the present invention provides a negative electrode and a lithium secondary battery including the same, the negative electrode being excellent in capacity properties, initial efficiency, and high-temperature lifespan properties.

Technical Solution

According to an aspect of the present invention, there is provided a negative electrode including a metal current collector and a negative electrode active material layer containing a negative electrode active material and metal nanowires and formed on the metal current collector, wherein the negative electrode active material includes a silicon-based active material and a carbon-based active material and the metal nanowires include one or more metals selected from the group consisting of copper, gold, nickel, cobalt, and silver.

According to another aspect of the present invention, there is provided a lithium secondary battery including the negative electrode.

Advantageous Effects

A negative electrode according to the present invention uses a silicon-based active material having a large capacity, thereby improving the capacity properties of a lithium secondary battery, and also uses metal nanowires not causing an electrochemical reaction with lithium, thereby maintaining an excellent initial efficiency. Also, the metal nanowires may minimize damage to a conductive path even when a silicon-based active material expands during charging and discharging, thereby improving the high-temperature lifespan properties of the lithium secondary battery.

MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

<Negative Electrode>

A negative electrode according to the present invention includes a metal current collector and a negative electrode active material layer which includes a negative electrode active material containing a silicon-based active material and a carbon-based active material and metal nanowires and which is formed on the metal current collector. Meanwhile, the metal nanowires include one or more metals selected from the group consisting of copper, gold, nickel, cobalt, and silver.

The metal current collector is not particularly limited as long as it has a high conductivity without causing a chemical change in a battery. For example, copper, gold, nickel, cobalt, silver, stainless steel, aluminum, titanium, fired carbon, copper or stainless steel that is surface-treated with one of carbon, nickel, titanium and the like, an aluminum-cadmium alloy, and the like may be used.

Alternatively, the metal current collector may have microscopic irregularities formed on the surface thereof to improve the coupling force to a negative electrode active material slurry, and may be used in various forms of such as a film, a sheet, a foil, a net, a porous body, a foam body, and a non-woven fabric body.

The negative electrode active material layer may be disposed on the current collector. Specifically, the negative electrode active material layer may be disposed on one surface or both surfaces of the current collector.

The negative electrode active material layer may include a negative electrode active material and metal nanowires.

The negative electrode active material includes a silicon-based active material and a carbon-based active material.

The silicon-based active material is a compound having a high discharge capacity, and includes silicon (Si), a silicon oxide represented by $SiO_x(0<X\le2)$, a metal silicate, and the like. Specifically, the silicon-based active material may include all of the silicon (Si), the silicon oxide represented by $SiO_x(0<X\le2)$, and the metal silicate. For example, the silicon-based active material may include a case in which the metal silicate is present in a phase form in a silicon-based active material represented by $SiO_x(0<X\le2)$.

The metal silicate may be formed by a method of doping or reducing a metal having a high reactivity with oxygen on a silicon oxide. In general, a silicon oxide ($SiO_x$, $0<x<2$) is formed in a structure in which silicon (Si) is located in a matrix form formed of silica ($SiO_2$). Some of lithium ions intercalated during a charging process are not released from the silica during a discharging process, and may be maintained in a lithium-silicate state. At this time, the higher the content present in the lithium-silicate state as described above, the lower the reversible capacity of a battery, which becomes a factor that deteriorates the initial efficiency of the battery. The metal silicate is formed to intentionally occupy an irreversible site in the silica, thereby serving to prevent the reversible capacity of the battery from decreasing. Accordingly, a metal having a high reactivity with oxygen may be used to form a metal silicate.

Specifically, for example, the metal silicate may include one or more selected from the group consisting of lithium silicate, magnesium silicate, aluminum silicate, calcium silicate and titanium silicate.

Meanwhile, the silicon-based active material of the present invention may further include carbon. More specifically, when silicon (Si), a silicon oxide represented by $SiO_x$ ($0<X\le2$), a metal silicate, and the like are located in a core, carbon may be included in a coating layer coated on the core. When carbon is included in a core-shell structure, conductivity may be further improved when compared with a silicon-based active material including only a silicon-based compound.

For example, when the silicon-based active material includes a core containing a silicon oxide represented by $SiO_x(0<X\le2)$ and a metal silicate present as a phase in the silicon oxide, the coating layer including carbon may be formed in the core containing the metal silicate and the surface of the core.

The diameter of the silicon-based active material may be 1 μm to 20 μm, preferably 1 μm to 15 μm, more preferably 1 μm to 10 μm. For example, the diameter of the silicon-based active material may be 1 μm to 3.5 μm. When the diameter of the silicon-based active material is within the above range, it is possible to maintain excellent lifespan properties of the battery while maintaining an optimal grinding yield in a manufacturing process. The diameter of the silicon-based active material may be measured by measuring the size, diameter, and the like of a particle by, through a particle size analyzer (PSA) and the like, irradiating a laser to the particle passing through the inside of a sensor in the analyzer and measuring a laser blocked or scattered by the particle.

Meanwhile, the carbon-based active material is an active material having a lower volume expansion rate during charge/discharge than a silicon-based active material and having a high discharge capacity at a certain level. The carbon-based active material may be included in the negative electrode active material layer together with the silicon-based active material. The carbon-based active material may include at least one selected from the group consisting of natural graphite, artificial graphite, hard carbon, soft carbon, carbon black, acetylene black, Ketjen black, Super P, graphene, and fibrous carbon.

In the negative electrode active material layer, the silicon-based active material and the carbon-based active material may be included at a weight ratio of 0.1:99.9 to 30:70, preferably 0.1:99.9 to 20:80, more preferably 0.1:99.9 to 7:93. When the silicon-based active material and the carbon-based active material are included in the above range, the capacity properties of the battery may be improved while minimizing the occurrence of a short circuit in the battery.

Next, metal nanowires will be described.

When compared with a case in which a graphite-based active material is used alone as a negative electrode active material, a silicon-based active material is a compound having a discharge capacity of 4 times or more, and has recently been studied in various ways to be applied to a negative electrode active material. However, a silicon-based active material has a problem in that the degree of contraction/expansion during charging and discharging is high, so that the capacity retention rate is sharply reduced as the number of charge and discharge increases, thereby having low lifespan properties.

In order to solve the above problem, there has been a discussion on forming an $SiO_2$ layer or forming a carbon coating layer on the surface of a silicon-based particle in a silicon-based active material. However, in the case of the above method, volume control is not smoothly performed as the charge/discharge cycle of the battery continues, so that the efficiency is still low.

Alternatively, there has been research conducted in various ways to add a carbon-based conductive material such as carbon nanotubes or graphene. However, the carbon-based conductive material has a high conductivity, but has a high electrochemical reactivity with lithium ions, so that the initial efficiency of the battery is low due to a high reversible capacity loss rate during a charging and discharging reaction, and thus, there is a problem that in that commercialization thereof is difficult.

Therefore, the present inventors have developed a negative electrode including metal nanowires instead of a carbon-based conductive material. Unlike a carbon-based conductive material, the metal nanowires do not participate in a reaction when a lithium ion battery and the like electrochemically react during charging and discharging, so that an irreversible capacity is not generated. Therefore, it is possible to maintain a high initial efficiency as well as to reduce damage to a conductive path due to the volume change of a silicon-based active material to a minimum, so that conductivity may also be maintained to be high.

The metal of the metal nanowires may be one or more metals selected from the group consisting of copper, gold, nickel, cobalt, and silver. Specifically, the metal nanowires may be one or more metals selected from the group consisting of copper, gold, and silver. When metal nanowires of the above materials are used, the metal nanowires may not participate in oxidation and reduction reactions at the driving potential of the negative electrode when the battery is driven. Accordingly, side reactions (alloy forming reaction) of the metal nanowires are suppressed during a charging and discharging process of the battery, thereby suppressing the deterioration in conductivity of the negative electrode. More specifically, the metal of the metal nanowires may be copper. The copper is advantageous in terms of cost when compared with other metals, and is easy to be manufactured into metal nanowires.

As the metal of the metal nanowires, the same metal as the metal of a metal current collector which is a component of a negative electrode may be used. In this case, the interface resistance between the metal current collector and the metal nanowires may be minimized, so that the efficiency of the battery may be improved.

The average diameter of the metal nanowires may be 1 nm to 500 nm, specifically 20 nm to 300 nm, more specifically 30 nm to 120 nm, and may preferably be 35 nm to 70 nm. When the average diameter of the metal nanowires is within the above range, the aggregation phenomenon among the metal nanowires is minimized, and even when the metal nanowires are added in the same content as that of a typical conductive material, a larger number of metal nanowires may be included in the negative electrode so that electrical conductivity is excellent. Particularly, when the average diameter of the metal nanowires is 35 nm to 70 nm, a conductive network in the negative electrode may be more uniformly formed while the metal nanowires are maintained without being broken.

The average length of the metal nanowires may be 0.5 µm to 250 µm, preferably 15 µm to 80 µm, more preferably 42 µm to 70 µm. When the average length of the metal nanowires is within the above range, even when the volume of a silicon-based active material expands during charging and discharging, thereby causing the gap between active material particles to increase, it is possible to minimize the disconnection of a conductive path. Particularly, when the average length of the metal nanowires is 42 µm to 70 µm, while a long conductive network may be formed due to a sufficient length, the aggregation phenomenon among the metal nanowires may be further minimized.

The metal nanowires may be easily observed through elemental analysis using an elemental analysis device such as the Energy Dispersive X-ray Spectrometer (EDS), and the shape, diameter, and length thereof may all be observed with the naked eye through a scanning electron microscope (SEM) and the like. Meanwhile, the average length and the average diameter of the metal nanowires may be calculated by obtaining an SEM photograph showing 100 metal nanowires in the negative electrode, measuring the length and the diameter of the metal nanowires, followed by sorting the measured values from the largest to the smallest, and then averaging the top 30 to 100 lengths and diameters from the largest value.

The metal nanowires may be included in the negative electrode active material layer in an amount of 0.001 wt % to 2.5 wt %, specifically 0.001 wt % to 2.2 wt %, more specifically 1.2 wt % to 2.2 wt %. When the above range is satisfied, an electrical contact network in an electrode is formed while minimizing the aggregation among the metal nanowires, thereby forming a wide conductive path wide, so that it is possible to maintain conductivity at a high level.

The negative electrode may further include a binder. More specifically, in order to form the negative electrode active material layer, a binder may be further added and used in addition to a solvent when preparing a negative electrode active material slurry. At this time, the binder is used to increase the physical adhesion between components contained in a negative electrode active material slurry and to increase the physical adhesion between a negative electrode active material slurry and a metal current collector when a negative electrode is manufactured. At this time, the binder may include at least any one selected from the group consisting of carboxy methyl cellulose (CMC), a polyvinylidene fluoride-hexafluoropropylene copolymer (PVDF-co-HFP), polyvinylidenefluoride, polyacrylonitrile, polymethylmethacrylate, polyvinyl alcohol, starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, polyacrylic acid, and a material which has the hydrogen thereof substituted with Li, Na, Ca, or the like, and may include various copolymers thereof.

The negative electrode may be formed by coating (applying and drying) a negative electrode active material slurry on the metal current collector. The negative electrode active material slurry may include a solvent together with the negative electrode active material and the metal nanowires described above. The solvent may include an organic solvent such as N-methyl-2-pyrrolidone (NMP), and may be used in an amount such that a preferable viscosity of the negative electrode active material slurry is achieved.

<Lithium Secondary Battery>

Next, a lithium secondary battery according to the present invention will be described.

The lithium secondary battery according to an embodiment of the present invention includes a positive electrode, a negative electrode, and an electrolyte for secondary battery, and selectively, may further include a separator which may be interposed between the positive electrode and the negative electrode. At this time, since the negative electrode is the same as that described above, a detailed description thereof will be omitted.

The positive electrode may be prepared by coating a positive electrode active material slurry on a positive electrode current collector, the positive electrode active material slurry including a positive electrode active material, a binder for positive electrode, a conductive material for positive electrode, and a solvent.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Alternatively, microscopic irregularities may be formed on the surface of the positive electrode current collector to improve the coupling force of the positive electrode active material, and the positive electrode current collector may be used in various forms of such as a film, a sheet, a foil, a net, a porous body, a foam body, and a non-woven fabric body.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein 0<Y1<1), $LiMn_{2-Z1}Ni_{Z1}O_4$ (wherein 0<Z1<2), etc.), a lithium-nickel-cobalt-based oxide (e.g., $LiNi_{1-Y2}Co_{Y2}O_2$ (wherein 0<Y2<1), etc.), a lithium-manganese-cobalt-based oxide (e.g., $LiCo_{1-Y3}Mn_{Y3}O_2$ (wherein 0<Y3<1), $LiMn_{2-Z2}Co_{Z2}O_4$ (wherein 0<Z2<2), etc.), a lithium-nickel-manganese-cobalt-based oxide (e.g., $Li(Ni_{p1}Co_{q1}Mn_{r1})O_2$ (wherein 0<p1<1, 0<q1<1, 0<r1<1, p1+q1+r1=1) or $Li(Ni_{p2}Co_{q2}Mn_{r2})O_4$ (wherein 0<p2<2, 0<q2<2, 0<r2<2, p2+q2+r2=2), etc.), or a lithium-nickel-cobalt-transition metal (M) oxide (e.g., $Li(Ni_{p3}Co_{q3}Mn_{r3}M_{s1})O_2$ (wherein M is selected from the group consisting of Al, Fe, V, Cr, Ti, Ta, Mg, and Mo, and p3, q3, r3, and s1 are each an atomic fraction of independent elements, wherein 0<p3<1, 0<q3<1, 0<r3<1, 0<s1<1, p3+q3+r3+s1=1) and the like, and any one thereof or a compound of two or more thereof may be included.

Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel cobalt aluminum oxide (e.g., $LiNi_{0.8}Co_{0.15}Al_{0.05}O_2$, etc.), and the like. When considering an remarkable improvement effect according to the control of type and content ratio of constituent elements forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and the like, and any one thereof or a mixture of two or more thereof may be used.

The binder for positive electrode is a component for assisting in coupling among a positive electrode active material, a positive electrode conductive material, and the like, and coupling to a current collector. Specifically, examples thereof may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene (PE), polypropylene, an ethylene-propylene-diene monomer (EPDM), a sulfonated EPDM, styrene-butadiene rubber-carboxymethyl cellulose (SBR-CMC), fluorine rubber, various copolymers thereof, and the like.

The conductive material for positive electrode is a component for further improving the conductivity of a positive electrode active material and is not particularly limited as long as it has conductivity without causing a chemical change in the battery. Examples thereof may include graphite; carbon black such as acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like. Specific examples of a commercially available conductive material may include acetylene black series (products of Chevron Chemical Company), Denka black (product of Denka Singapore Private Limited, Gulf Oil Company, etc.), Ketjen black, EC series (product of Armak Company), Vulcan XC-72 (product of Cabot Company), and Super P (product of Timcal company).

The solvent may include an organic solvent such as N-methyl-2-pyrrolidone (NMP), and may be used in an amount such that a preferred viscosity is achieved when the positive electrode active material, and selectively, a binder for positive electrode and a positive electrode conductive material, and the like are included.

The electrolyte for lithium secondary battery may be an organic-based liquid electrolyte, an inorganic-based liquid electrolyte, a solid polymer electrolyte, a gel-type polymer electrolyte, a solid inorganic electrolyte, a molten-type inorganic electrolyte, and the like, which may be used in the manufacturing a lithium secondary battery, but is not limited thereto.

For example, the electrolyte for a lithium secondary battery may include an organic solvent and a lithium salt.

Any organic solvent may be used as the organic solvent without particular limitation as long as it may serve as a medium through which ions involved in an electrochemical reaction of the battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, when the cyclic carbonate and the chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte for a lithium secondary battery, in order to improve lifetime properties of a battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in addition to the electrolyte components.

As the separator, a porous polymer film which has been typically used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a polyolefin-based porous polymer film coated with inorganic particles (e.g., $Al_2O_3$), or a typical porous non-woven fabric, for example, a non-woven fabric formed of a glass fiber having a high melting point or polyethylene terephthalate fiber may be used, but the present invention is not limited thereto.

According to another embodiment of the present invention, a battery module including the lithium secondary battery as a unit cell and a battery pack including the same are provided. The battery module and the battery pack include the lithium secondary battery having high capacity, high rate properties, and cycle properties, and thus may be used as a power source of a medium-and-large sized device selected from the group consisting of an electric vehicle, a hybrid electric vehicle, a plug-in hybrid electric vehicle, and a power storage system.

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

1. Example 1

(1) Manufacturing Negative Electrode

Powder prepared by mixing Si and $SiO_2$ at a molar ratio of 1:1 was vacuum heated at 1,400° C. to form SiO vapor. Also, magnesium (Mg) was vacuum heated at 700° C. to form magnesium (Mg) vapor.

The SiO vapor and the magnesium (Mg) vapor were mixed in a weight ratio of 95:5 and reacted in a cooling zone of 500° C. to be condensed into a solid phase, and then pulverized using a ball mill to prepare silicon-based particles including a magnesium silicate (Mg—SiO) having a diameter of 5 μm in a phase.

Thereafter, the magnesium silicate (Mg—SiO) powder was placed in a hot zone of a chemical vapor deposition (CVD) apparatus while argon (Ar) gas was flowed to maintain an inert atmosphere. Then, using argon (Ar) gas as a carrier gas, methane was blown into a hot zone of 900° C. and reacted at $10^{-1}$ torr for 20 minutes to prepare a silicone-based active material having a coating layer containing carbon formed on the surface of the silicon-based particles including the magnesium silicate (Mg—SiO). Artificial graphite was used as a carbon-based active material.

96 parts by weight of a negative electrode active material (a silicon-based active material:artificial graphite=5:95 mixing weight ratio), 1 part by weight of copper nanowires (average length: 20 μm, average diameter: 100 nm, Sigma Aldrich Co., Ltd.), 1 part by weight of carboxymethyl cellulose, and 2 parts by weight of styrene butadiene rubber were mixed with water, which is a solvent, to prepare a negative electrode active material slurry having a solid content of 50 wt %.

The negative electrode active material slurry was applied on a copper (Cu) thin film having a thickness of 15 μm, which is a metal current collector, dried, and then roll pressed to manufacture a negative electrode having a negative electrode active material layer formed on the metal current collector.

(2) Manufacturing Half-Cell

A polypropylene separator was interposed between a lithium metal which is a counter electrode and the negative electrode manufactured above, and then an electrolyte was injected thereto to manufacture a half-cell, the electrolyte which was prepared by adding 1 wt % of vinylene carbonate (VC) and 0.5 wt % of propane sultone (PS) to a solvent in which ethylene carbonate (EC) and ethyl methyl carbonate (EMC) are mixed at a volume ratio of 30:70 and then dissolving 1 M of $LiPF_6$ therein.

2. Example 2

A negative electrode and a half-cell were manufactured in the same manner as in Example 1 except that a negative electrode active material slurry was prepared to include 2 parts by weight of copper nanowires and 95 parts by weight of a negative electrode active material based on 100 parts by weight of the solid content except for a solvent (water) in the negative electrode active material slurry in Example 1.

3. Example 3

A negative electrode active material, a negative electrode, and a half-cell were manufactured in the same manner as in Example 1 except that a negative electrode active material slurry was prepared by using 1 part by weight of silver nanowires (average length: 10 μm, average diameter: 60 nm), instead of copper nanowires, based on 100 parts by weight of the solid content except for a solvent (water) in the negative electrode active material slurry in Example 1.

4. Example 4

A negative electrode active material, a negative electrode, and a half-cell were manufactured in the same manner as in Example 1 except that a negative electrode active material was prepared by mixing a silicon-based active material and artificial graphite at a weight ratio of 10:90 in Example 1.

5. Example 5

A negative electrode active material, a negative electrode, and a half-cell were manufactured in the same manner as in Example 1 except that copper nanowires having an average diameter of 200 nm and an average length of 30 μm were used instead of the copper nanowires of Example 1.

6. Example 6

A negative electrode active material, a negative electrode, and a half-cell were manufactured in the same manner as in Example 1 except that copper nanowires having an average diameter of 50 nm and an average length of 50 μm were used instead of the copper nanowires of Example 1.

7. Example 7

A negative electrode active material, a negative electrode, and a half-cell were manufactured in the same manner as in Example 1 except that the average particle diameter (D50) of the silicon-based active material of Example 1 was 3 μm.

COMPARATIVE EXAMPLES

1. Comparative Example 1

A negative electrode active material, a negative electrode, and a half-cell were manufactured in the same manner as in Example 1 except that a negative electrode active material was prepared by using 1 part by weight of Super-C (diameter: 65 nm) instead of 1 part by weight of coper nanowires in Example 1.

2. Comparative Example 2

A negative electrode active material, a negative electrode, and a half-cell were manufactured in the same manner as in Example 1 except that a negative electrode active material was prepared by using 1 part by weight of carbon nanotubes (average length: 10 μm, average diameter: 10 nm) instead of 1 part by weight of copper nanowires in Example 1.

3. Comparative Example 3

A negative electrode active material, a negative electrode, and a half-cell were manufactured in the same manner as in Example 1 except that a negative electrode active material was prepared by using 1 part by weight of Super-C (diameter: 65 nm) instead of 1 part by weight of coper nanowires in Example 4.

TABLE 1

| | Content of metal nanowires (wt %) | Type of metal nanowires | Average diameter (nm) of metal nanowires | Average length (μm) of metal nanowires | Average particle diameter ($D_{50}$) of silicon-based particles | Weight ratio of silicon-based active material and carbon-based active material |
|---|---|---|---|---|---|---|
| Example 1 | 1 | Copper | 100 | 20 | 5 | 5:95 |
| Example 2 | 2 | Copper | 100 | 20 | 5 | 5:95 |
| Example 3 | 1 | Silver | 60 | 10 | 5 | 5:95 |
| Example 4 | 1 | Copper | 100 | 20 | 5 | 10:90 |
| Example 5 | 1 | Copper | 200 | 30 | 5 | 5:95 |
| Example 6 | 1 | Copper | 50 | 50 | 5 | 5:95 |
| Example 7 | 1 | Copper | 100 | 20 | 3 | 5:95 |
| Comparative Example 1 | Super-C 1 wt % | Super-C - (Average particle diameter: 65 nm) | | — | 5 | 5:95 |
| Comparative Example 2 | CNT 1 wt % | CNT | CNT 10 nm | CNT 10 μm | 5 | 5:95 |
| Comparative Example 3 | Super-C 1 wt % | Super-C - (Average particle diameter: 65 nm) | | — | 5 | 10:90 |

EXPERIMENTAL EXAMPLES

1. Experimental Example 1. Evaluation of Initial Efficiency and Capacity Retention Rate Each of the half-cells manufactured in Examples and Comparative Examples was charged and discharged under the following conditions.

1) 1st Cycle
   Charging condition: CC/CV 0.1 C, 5 mV/0.005 C cut-off
   Discharging condition: CC 0.1 C, 1.5 V cut-off
2) 2nd Cycle
   Charging condition: CC/CV 0.1 C, 5 mV/0.005 C cut-off
   Discharging condition: CC 0.1 C, 1.0V cut-off
3) 3rd Cycle or later
   Charging condition: CC/CV 0.5 C, 5 mV/0.005 C cut-off
   Discharging condition: CC 0.5 C, 1.0 V cut-off The initial efficiency was calculated by the following Equation 1.

Initial efficiency(%)=(1st cycle discharge capacity/1st cycle charge capacity)×100  [Equation 1]

The capacity retention rate was calculated by the following Equation 2.

Capacity retention rate (%)={(Discharge capacity at 30th cycle)/(1.0 V discharge capacity at 1st cycle)}×100  [Equation 2]

The results are shown in Table 2 below.

2. Experimental Example 2: Evaluation of High-Temperature (60° C.) Capacity Properties Each of the half-cells manufactured in Examples and Comparative Examples was charged at 25° C. with a constant current (CC) of 0.1 C until 5 mV was reached. Thereafter, the half-cells were charged to a constant voltage (CV) of 5 mV until a charging current reached 0.005 C (cut-off current). Then, after being left to stand for 30 minutes, the half-cells were discharged with a constant current (CC) of 0.1 C until 1.5 V was reached. Thereafter, discharge capacity was measured when the above charge/discharge was repeated for three times, and was defined as an initial discharge capacity.

With 4 cycles, the cells were charged with a constant current (CC) of 0.1 C until 5 mV was reached, and then were charged to a constant voltage (CV) of 5 mV until a charging current reached 0.005 C (cut-off current), followed by being stored for 4 weeks at 60° C. Thereafter, the cells were discharged with a constant current (CC) of 0.1 C until 1.5 V was reached. Thereafter, the cells were driven under the following conditions over three times, and a finally measured discharge capacity was defined as a final discharge capacity.

Conditions: A cell is charged with a constant current (CC) of 0.1 C until 5 mV is reached. Thereafter, the cell is charged to a constant voltage (CV) of 5 mV until a charging current reaches 0.005 C (cut-off current). Then, after being left to stand for 30 minutes, the cell is discharged with a constant current (CC) of 0.1 C until 1.5 V is reached.

At this time, the capacity retention rate was measured by comparing the initial discharge capacity with the final discharge capacity, and the results are shown in Table 2 below.

TABLE 2

| | Initial efficiency (%) | Capacity retention rate (%) | High-temperature capacity retention rate (%) |
|---|---|---|---|
| Example 1 | 90 | 94 | 93 |
| Example 2 | 90 | 96 | 95 |
| Example 3 | 90 | 93 | 93 |
| Example 4 | 89 | 90 | 87 |
| Example 5 | 90 | 93 | 92 |
| Example 6 | 90 | 95 | 94 |
| Example 7 | 90 | 95 | 94 |
| Comparative Example 1 | 90 | 90 | 90 |
| Comparative Example 2 | 88 | 92 | 91 |
| Comparative Example 3 | 88.5 | 80 | 79 |

According to Table 1 above, it can be seen that each of the cells according to Examples has a high capacity retention rate and a high high-temperature capacity retention rate while having a high initial efficiency. Meanwhile, it can be seen that a higher initial efficiency, capacity retention rate and high-temperature capacity retention rate were obtained in the case of Example 4 when compared with Comparative Example 3 using a negative electrode active material including a silicon-based active material and a carbon-based active material in the same weight ratio.

In addition, when comparing Example 1 and Example 7, when considering the compatibility with the metal nanowires used in the present invention, it can be seen that an effect is was further improved when using a silicon-based active material having an appropriate average particle diameter.

In addition, when comparing Example 1 and Example 3, it can be seen that the capacity retention rate of Example 1 using copper nanowires, which is the same material as that of a copper current collector, was more excellent.

In addition, referring to Examples 1, 5, and 6, it can be seen that when the average diameter and average length of metal nanowires were at appropriate levels, initial efficiency, capacity retention rate, and high-temperature capacity retention rate effects were maximized.

The invention claimed is:

1. A negative electrode comprising:
   a metal current collector; and
   a negative electrode active material layer including a negative electrode active material and metal nanowires and formed on the metal current collector, wherein
   the negative electrode active material comprises a silicon-based active material and a carbon-based active material at a weight ratio in the range of 0.1:99.9 to 7:93,
   the metal nanowires include one or more metals selected from the group consisting of copper, gold, nickel, cobalt, and silver, and
   wherein an average diameter of the metal nanowires ranges from 20 nm to 300 nm.

2. The negative electrode of claim 1, wherein the metal of the metal nanowires is copper.

3. The negative electrode of claim 1, wherein the metal of the metal nanowires is same metal as a metal of a metal current collector.

4. The negative electrode of claim 1, wherein an average diameter of the metal nanowires is 30 nm to 120 nm.

5. The negative electrode of claim 1, wherein an average length of the metal nanowires is 0.5 μm to 250 μm.

6. The negative electrode of claim 1, wherein an average length of the metal nanowires is 42 μm to 70 μm.

7. The negative electrode of claim 1, wherein the metal nanowires are included in the negative electrode active material layer in an amount of 0.001 wt % to 2.5 wt %.

8. The negative electrode of claim 1, wherein the silicon-based active material comprises $SiO_X$ (0<X≤2) and a metal silicate phase included in the $SiO_X$ (0<X≤2).

9. The negative electrode of claim 8, wherein the metal silicate comprises one or more selected from the group consisting of lithium silicate, magnesium silicate, aluminum silicate, calcium silicate and titanium silicate.

10. The negative electrode of claim 1, wherein the silicon-based active material comprises a core and a coating layer formed on the surface of the core and containing carbon, wherein the core includes $SiO_X$ (0<X≤2) and a metal silicate phase included in the $SiO_X$ (0<X≤2).

11. A lithium secondary battery comprising the negative electrode according claim 1.

12. The negative electrode of claim 1, wherein a diameter of the silicon-based active material ranges from 1 μm to 15 μm.

* * * * *